3,157,695
GUANIDINE DERIVATIVES
Pierre Lafont, Lyon, and Henri Francois Albert Menand, Saint-Fons, France, assignors to Rhone-Poulenc S.A.
No Drawing. Filed July 24, 1961, Ser. No. 125,990
Claims priority, application France July 27, 1960
4 Claims. (Cl. 260—501)

This invention relates to a new guanidine derivative and salts thereof, to a process for their preparation and to parasiticidal compositions containing them.

According to the present invention, there are provided the hitherto unknown compounds cyclododecylguanidine, and its organic and inorganic salts. The salts preferably contain either a carboxylic acid group such as the acetate, propionate, butyrate, valerate, caproate, laurate, maleate, phthalate or benzoate, or an inorganic acid group such as the carbonate, hydrochloride, nitrate, or sulphate. Preferred salts are the acetate, hydrochloride and sulphate, the acid groups named being non-phytotoxic acids.

The aforesaid new compounds may be obtained by application of any known method for the preparation of lower alicyclic homologues of cyclododecylguanidine, such as cyclohexylguanidine. According to a feature of the invention, cyclododecylguanidine and organic and inorganic salts thereof are prepared by heating cyanamide with an organic or inorganic salt of cyclododecylamine in an anhydrous solvent medium and, if desired, converting the salt of cyclododecylguanidine thus obtained into the base or a different salt. The anhydrous solvent medium may be, for example, a higher aliphatic alcohol such as n-amyl alcohol or an aromatic hydrocarbon such as benzene or toluene, or a mixture of such solvents. Preferably an excess of cyanamide is employed, and the solvent medium is removed during the course of the condensation by distillation. The condensation is advantageously effected at the boiling temperature of the reaction mixture, for example, 130–140° C. when n-amyl alcohol is used as a solvent.

Cyclododecylguanidine itself may be obtained by the action of an aqueous solution of an alkali metal hydroxide on one of its salts with an organic or inorganic acid. The conversion of salt to base is preferably carried out at the reflux temperature of the reaction medium with simultaneous extraction with an inert solvent, e.g. benzene, in order to protect the cyclododecylguanidine base obtained from decomposition by the alkaline solution.

Inorganic salts of cyclododecylguanidine may be obtained by the direct action of inorganic acids on an alcoholic solution of an organic salt of the base.

The new guanidine compounds of the present invention are excellent parasiticides which are useful in the treatment of leaf spot and in combatting diseases of plant, cereals and fruit trees. They possess high antifungal activity which is demonstrated by in vitro tests on moulds such as *Sterigmatocystis nigra, Stemphylium radicinum, Fusarium oxysporum, Gibberella zeae, Penicillium ansari mofidi, Candida albicans, Rhizopus nigricans* and by in vivo tests on parasites such as, for example, bunt of wheat (*Tilletia caries*), kidney bean anthracnose (*Colletotrichum lindemuthianum*), potato blight (*Phytophthora infestans*), and apple mildew (*Podosphaera leucotricha*).

The parasiticidal activity of cyclododecylguanidine in the form of its acetate is illustrated by the results obtained in experiments in which the activity is compared with that of laurylguanidine acetate, a known compound employed as a parasiticide. The results are tabulated below:

TABLE

|  | In Vitro Experiments | | | In Vivo Experiments | |
|---|---|---|---|---|---|
|  | $CA_{95-100}$ in mcg./cc.[1] observed on the fungi given below [2] | | | $CA_{95-100}$ in mcg./cc.[1] observed on the parasites given below [3] | |
|  | S.r. | F.o. | G.(. | Blight | Mildew |
| Laurylguanidine (acetate) | 400 | 250 | 1,000 | 1,000 | 4,000 |
| Cyclododecylguanidine (acetate) | 250 | 100 | 750 | 750 | 3,000 |

[1] $CA_{95-100}$ = concentration giving 95–100% activity.
[2] S.r. = *Stemphylium radicinum*; F.o. = *Fusarium oxysporum*; G.z. = *Gibberella zeae*.
[3] Potato blight: *Phytophthora infestans*; apple mildew: *Podosphaera leucotricha*.

From the figures given in the table it will be seen that, for the same parasiticidal activity, the quantity of cyclododecylguanidine required is lower than that of laurylguanidine.

According to another feature of the present invention, there are provided parasiticidal, in particular fungicidal, compositions containing as active ingredient cyclododecylguanidine or an organic or inorganic salt thereof in association with one or more diluents compatible with the active ingredient and suitable for use in parasiticidal compositions. Preferably the compositions contain between 0.5 and 95% by weight of the guanidine compound. The compositions may be solid if there is employed a powdered solid compatible diluent such as talc, calcined magnesia, kieselguhr, tricalcium phosphate, powdered cork, absorbent carbon black or a clay such as kaolin or bentonite. Instead of solid diluent, there may be used a liquid in which the guanidine compound is dissolved or dispersed. The compositions may thus take the form of aerosols, suspensions, emulsions or solutions in water, organic or aqueous organic media, for example aromatic hydrocarbons such as toluene or xylene or mineral, animal or vegetable oils, or mixtures of these diluents. The compositions in the form of dispersions, solutions or emulsions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol or p-isopropylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are desired, the guanidine compound may be used in the form of self-emulsifying concentrates containing the active substance dissolved in the dispersing agent or in a solvent containing a dispersing agent compatible with the active ester and solvent, a simple addition of water producing compositions ready for use.

The solid compositions are preferably prepared by grinding the guanidine compound with the solid diluent, or by impregnating the solid diluent with a solution of the guanidine compound in a volatile solvent, evaporating the solvent and, if necessary, grinding the product so as to obtain a powder.

For parasiticidal purposes the active substances may be employed in dosages varying within relatively wide limits but dosages corresponding to a quantity of from 800 to 3,000 g. of active substance per hectare are generally suitable. It is generally convenient to use the active substances diluted with water, dilutions of from 50 to 200 g. of active substance per hectolitre of water being suitable.

The following examples illustrate the preparation of products according to the invention.

Example I

A flask (3 litres) fitted with a stirrer, a thermometer and a reflux condenser is charged, in order, with:

Cyclododecylamine acetate, 243.3 g. (i.e. 1 mole) [prepared by the reaction of acetic acid with cyclododecylamine in methanol according to Prelog, Helv. Chim. Acta 33, 368 (1950)].

| | |
|---|---|
| Cyanamide _____ g__ | 61.0 |
| n-Amyl alcohol _____ cc__ | 400 |
| Anhydrous benzene _____ cc__ | 1200 |

The reaction mixture is heated gently with stirring and when the temperature of the body of the reactants reaches 83° C., benzene commences to distill off. Benzene is completely removed in 4 hours and the temperature in the flask is then raised to 130–140° C. and maintained for 3 hours. The homogenous mass is allowed to cool, and the crystals which form are separated. These crystals are washed with absolute alcohol (100 cc.), a mixture of absolute alcohol (1 vol.) and ether (2 vol.) (3× 100 cc.), and ether (4× 100 cc.). A crude cyclododecylguanidine acetate (192 g.), M.P. 208–210° C., is obtained (67.3% of theoretical yield calculated from the amine acetate starting material). By recrystallisation of the crude product from absolute alcohol (3 litres), pure cyclododecylguanidine acetate (155 g.) is obtained, M.P. 213–214° C.

Analysis:

| | Percent C | Percent H | Percent N |
|---|---|---|---|
| Calculated for $C_{15}H_{30}O_2N_3$ | 63.13 | 11.23 | 14.72 |
| Found | 63.55 | 11.83 | 14.72 |

Example II

A flask (1 litre), fitted with a stirrer, a thermometer, a reflux condenser and an inlet tube for inert gas, is charged, under nitrogen, with cyclododecylguanidine acetate (12 g.) and methanol (400 cc.). 0.5 N hydrochloric acid (86 cc.) is added with stirring and without heating. The temperature rises to 25°–30° C. and the methanol is distilled off in vacuo at below 30° C. The aqueous solution is kept under nitrogen and crystallises on cooling. The crystals are filtered off, washed with water (10 cc.), separated and dried. Cyclododecylguanidine hydrochloride (10.9 g., representing a 99% yield) is obtained as microcrystalline white powder, M.P. 227–229° C.

Analysis:

| | Percent C | Percent H | Percent N | Percent Cl |
|---|---|---|---|---|
| Calculated for $C_{13}H_{28}N_3Cl$ | 59.62 | 10.78 | 16.04 | 13.56 |
| Found | 59.31 | 10.56 | 15.85 | 13.47 |

Example III

A flask similar to that used in Example II is charged with cyclododecylguanidine acetate (12 g.) and methanol (400 cc.) followed, with stirring, by N sulphuric acid (42 cc.). After distillation of the methanol in vacuo, a concentrate (72.9 g.) is recovered which is filtered, washed with water (30 cc.), separated and dried. A dry product (10.6 g.), representing a 92.2% yield of cyclododecylguanidine sulphate, is obtained in the form of a voluminous powder, M.P. 280–281° C., analysis of which gives the following:

| | Percent C | Percent H | Percent N | Percent S |
|---|---|---|---|---|
| Calculated for $C_{26}H_{56}N_6O_4S$ | 56.89 | 10.28 | 15.31 | 5.84 |
| Found | 56.99 | 10.25 | 15.16 | 5.71 |

Example IV

A flask (1 litre), fitted with a stirrer, a thermometer, a reflux condenser and an inlet-pipe for inert gas, is charged, under nitrogen (free from carbon dioxide) and with stirring at ordinary temperature, with:

| | |
|---|---|
| Cyclododecylguanidine acetate _____ g__ | 10.1 |
| 0.5 N sodium hydroxide solution _____ cc__ | 250 |
| Benzene _____ cc__ | 500 | and heated under reflux for two hours with stirring. At the end of this period, stirring is stopped and the organic layer syphoned off. Benzene (200 cc.) is added to the flask and heated under reflux for 30 minutes. The syphoning operation is repeated three times, using on each occasion benzene (200 cc.). The four decanted portions are combined and crystallisation occurs on cooling. After filtration, the crystals are washed with benzene (3× 10 cc.). Crude cyclododecylguanidine (7 g., representing 87.7% of the theoretical yield) is obtained.

In order to recrystallise the crude product, the base (3.01 g.) is heated for 30 minutes under reflux with anhydrous benzene (70 cc.). The solution is filtered hot to remove the turbidity which forms. The filtrate crystallises on cooling and is washed with benzene (3× 2 cc.), separated under pressure of nitrogen to prevent formation of the carbonate, and dried. Pure cyclododecylguanidine (2.7 g.) is obtained in the form of a white powder of microcrystalline flakes, M.P. 142–143° C. Analysis gives the following:

| | Percent C | Percent H | Percent N |
|---|---|---|---|
| Calculated for $C_{13}H_{27}N_3$ | 69.28 | 12.08 | 18.65 |
| Found | 69.14 | 12.14 | 18.29 |

The alkali titre of the product, measured in aqueous alcoholic medium in the presence of bromphenol blue, is 99.8%.

We claim:
1. A member of the class consisting of cyclododecylguanidine and acid addition salt thereof with non-phytotoxic acids.
2. Cyclododecylguanidine acetate.
3. Cyclododecylguanidine hydrochloride.
4. Cyclododecylguanidine sulphate.

References Cited in the file of this patent

UNITED STATES PATENTS

| | | |
|---|---|---|
| 2,213,474 | Puetzer | Sept. 3, 1940 |
| 2,289,541 | Ericks et al. | July 14, 1942 |
| 2,921,881 | Lamb | Jan. 19, 1960 |
| 2,966,512 | Gagliardi | Dec. 27, 1960 |
| 2,967,125 | Carlson | Jan. 3, 1961 |
| 2,972,563 | Richter | Feb. 21, 1961 |
| 3,004,065 | Gagliardi | Oct. 10, 1961 |